J. W. DAWSON.
BORING TOOL.
APPLICATION FILED FEB. 12, 1912.
1,045,000.
Patented Nov. 19, 1912.
Fig. I.
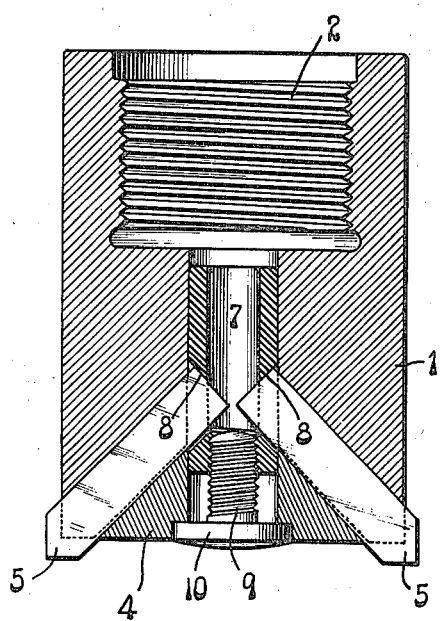
Fig. II.
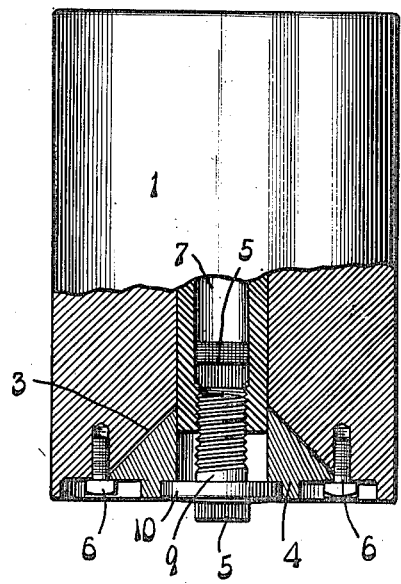
Fig. III.
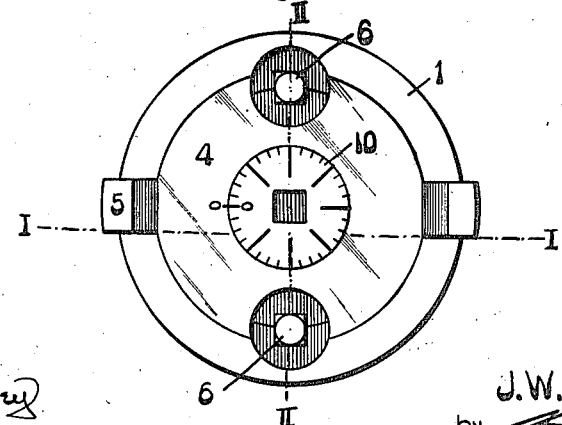
Attest
A. J. McCauley
E. B. Linn
Inventor:
J. W. Dawson,
by Knight & Cook
Attys.

UNITED STATES PATENT OFFICE.

JOSEPH W. DAWSON, OF ST. LOUIS, MISSOURI, ASSIGNOR TO BARRY-WEHMILLER MACHINERY COMPANY, OF ST. LOUIS, MISSOURI, A CORPORATION.

BORING-TOOL.

1,045,000.      Specification of Letters Patent.      Patented Nov. 19, 1912.

Application filed February 12, 1912. Serial No. 676,998.

*To all whom it may concern:*

Be it known that I, JOSEPH W. DAWSON, a citizen of the United States of America, and a resident of the city of St. Louis and State of Missouri, have invented certain new and useful Improvements in Boring-Tools, of which the following is a full, clear, and exact description, reference being had to the accompanying drawings, forming a part of this specification.

My invention relates to a boring tool, and has for its object the production of a very simple boring tool provided with cutters which may be very easily adjusted to bore holes of different diameters.

Figure I is a vertical section of my improved boring tool, taken on the line I—I, Fig. III. Fig. II is a section taken on the line II—II, Fig. III. Fig. III is a bottom view of the boring tool.

In the accompanying drawings: 1 designates a cutter head having a threaded end 2 adapted to be attached to a threaded spindle. The cutter head 1 is provided at its lower end with a conical or V-shaped recess 3 for the reception of a conical or V-shaped clamping block 4.

5 designates cutters arranged between the clamping block 4 and the cutter head 1, said cutter being preferably seated in grooves in the head. Screws 6, fitted to the head 1, are provided with heads which engage the bottom face of the clamping block 4.

The head 1 and clamping block 4 are each provided with a central bore for the reception of a wedge 7, said wedge being preferably in the form of a sleeve having inclined faces 8 which engage the butts of the cutters 5. The wedge 7 is threaded internally to receive an adjusting screw 9, the head 10 of which is seated in a counterbore in the clamping block 4.

In adjusting the cutters 5, the clamping block 4 is released from the cutters by turning the screws 6, and the adjusting screw 9 may then be operated to move the wedge 7 longitudinally, with the result of moving the cutters outwardly relative to the axis of the cutter head 1. After the desired adjustment is obtained, the screws 6 are tightened to firmly clamp the cutters between the clamping block 4 and the cutter head. To enable the operator to very accurately adjust the cutters, the head of the screw 9 is graduated, as seen in Fig. III.

I claim:

1. A boring tool comprising a cutter head having a conical recess in one end and provided with a longitudinal bore, a conical clamping block fitted in the recessed end of said cutter head, cutters arranged between the clamping block and cutter head, screws fitted to said cutter head for forcing said clamping block into engagement with said cutters, a wedge between said cutters and longitudinally operable in the bore in said cutter head, said wedge having inclined faces which engage the butts of said cutters.

2. A boring tool comprising a cutter head having a conical recess in one end and provided with a longitudinal bore, a wedge longitudinally operable in said bore and having recesses providing inclined bearing faces, means for operating said wedge member in said bore, cutters arranged in the cutter head, the butts of which bear against the inclined faces of the recessed wedge member, and a conical clamping block fitted in the conically recessed end of the cutter head and adapted to clamp the cutters.

3. A boring tool comprising a cutter head having a conical recess in one end and provided with a longitudinal bore, a tubular wedge longitudinally operable in said bore, and having conical recesses to provide inclined bearing faces, said wedge being provided with screw threads at one end, a screw adapted to engage said screw threaded end of said wedge, said screw being provided with a head of a diameter greater than the diameter of the longitudinal bore in the cutter head, cutters arranged in the cutter head the butts of which bear against the inclined faces of the recesses in the wedge, a conical clamping block having a bore in which the wedge and screw are adapted to operate longitudinally thereof, the head of said screw bearing against the outer face of said clamping block, said clamping block
5 being fitted to the recessed end of the cutter head, and being adapted to clamp the cutters in any desired position of adjustment, and screws entering the cutter head to retain said clamping block in clamping position.

JOSEPH W. DAWSON.

In the presence of—
A. J. McCAULEY,
E. B. LINN.